(No Model.)
H. R. BARNHURST & LE GRAND SKINNER.
STEAM ENGINE GOVERNOR.
No. 289,801. Patented Dec. 11, 1883.
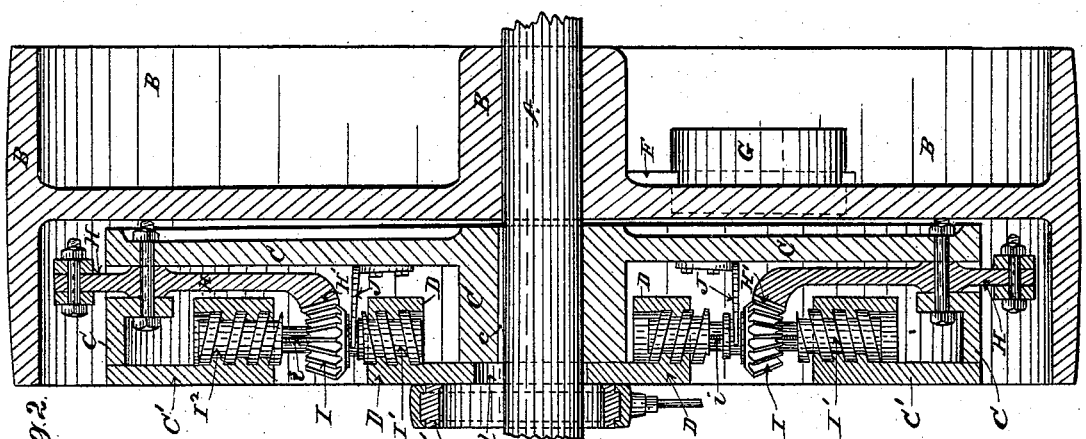
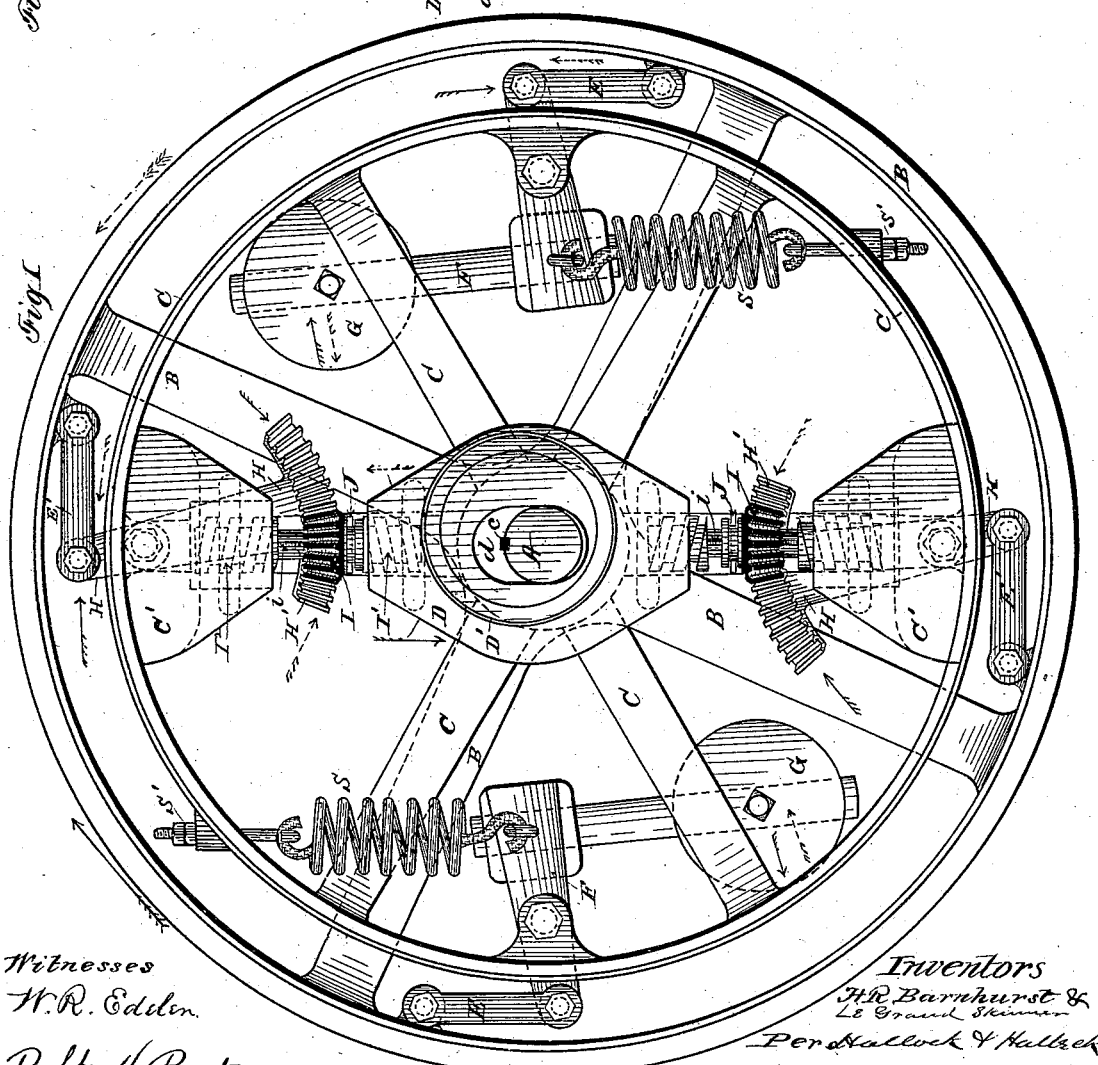
Witnesses
W. R. Edelen
Robt. A. Porter
Inventors
H. R. Barnhurst &
Le Grand Skinner
Per Hallock & Hallock
Att's

UNITED STATES PATENT OFFICE.

HENRY R. BARNHURST AND LE GRAND SKINNER, OF ERIE, PENNSYLVANIA.

STEAM-ENGINE GOVERNOR.

SPECIFICATION forming part of Letters Patent No. 289,801, dated December 11, 1883.

Application filed January 18, 1883. (No model.)

*To all whom it may concern:*

Be it known that we, HENRY R. BARNHURST and LE GRAND SKINNER, citizens of the United States, residing at Erie, in the county of Erie and State of Pennsylvania, have invented certain new and useful Improvements in Steam-Engine Governors; and we do hereby declare the following to be a full, clear, and exact description of the invention, such as will enable others skilled in the art to which it appertains to make and use the same.

This invention relates to steam-engine governors; and it consists in providing a new and improved construction for that class of steam-engine governors wherein the centrifugal balls revolve upon the crank-shaft of the engine and effect the movements of the steam-valves by shifting the eccentric upon the shaft.

The invention is also susceptible of application to that sub-class of the above-named class wherein the drive-wheel of the engine is so connected with the governor as to cause the resistance of the load to restrain the centrifugal movements of the balls or weights dynamometrically, and thereby aid in the government of the engine. As shown in the drawings, the device is thus applied. The only change necessary to effect this applicaton or non-application is in the part which is secured firmly to the shaft. As shown, it is the part C, which is keyed to the shaft, and the drive-wheel B is loose upon the shaft; but when a simple centrifugal governor is wanted only, the wheel B is not used as a drive-wheel, and the proportion of weights and springs are properly modified.

The advantages obtained by our construction are as follows: First, simplicity of construction and operation, and hence cheapness, accuracy, and certainty of action, and non-liability to clog or gum up; second, positiveness of action, and hence an avoidance of lost motion in the parts and a complete locking of parts against back thrust or resistance of the valve or valve-gear. Most of these advantages are secured through the mechanism by which the shifting of the eccentric is effected, which is done by a screw which is operated by a reciprocating segment rack and pinion, which is actuated through its connection with the centrifugal balls or the moving parts of the governing device. This application of the screw or compound screw to shift the eccentric upon the shaft constitutes the essential feature of our invention, and hence we do not desire to be limited to the precise construction of said screw or the manner of its operation as we have here shown it, for it is obvious that various methods of applying the screw would be quickly suggested to a mechanic on examination of the manner here shown. The great advantages derived from the use of a screw for shifting the eccentric in conjunction with those above mentioned is the extreme ease with which the shifting can be done, and hence obviating the use of such large centrifugal balls, and yet attain such extreme delicacy of adjustment at low rates of speed.

Our device is illustrated in the accompanying drawings as follows: Figure 1 is a plane side elevation of the drive-wheel and governor of a steam-engine. Fig. 2 is a vertical section of the same vertically and centrally through Fig. 1.

A is the crank-shaft of the engine.
B is the drive-wheel.
C is the governor-frame.
D is a shifting-plate, carrying the eccentric D'.
F F are the arms or levers, carrying the balls G.
H H are arms or levers, carrying the quadrant-shaped racks H'.
I I are the pinions, which are mounted loosely on the screw-shaft by a spline and groove, *i*, and held from lateral movement on said shaft by the forked arms J J, thus leaving the screw-shaft to move longitudinally when rotated.

I' I² and I' I² are the screws on the screw-shafts. Each pair of screws are oppositely threaded, and the arrangement of the oppositely-threaded screws is reversed in each pair, so that the ends of the two which are nearest the shaft are oppositely threaded, and so of those which are farthest from the shaft. Both screw-shafts are revolved simultaneously in opposite directions, and will therefore move endwise simultaneously in the same direction diametrically to the shaft. These screws work in nuts at the ends of the plate D and in the nut-plates C' C', and thus move the plate D and eccentric D'. Of course it must be understood that screws at both ends of the screw-shafts are not necessary, for the shafts could be swiveled at their outer or inner ends and have on each only one screw, which would be oppositely-threaded from that on the other; but by using two screws on each we get a somewhat better result; also, we might have the screws on sleeves extending from the pinions and let the shafts be stationary.

Motion is communicated to the levers H, which bear the segment-racks H', from the ball-levers F through the drive-wheel B.

S S are springs, which resist the centrifugal force of the balls, and are applied from the rim of the frame C to the levers F. The tension of these springs can be regulated by the nuts S' S', and thereby the degree of resistance they exert upon the outward movement of the balls, and thus the speed of the engine can be adjusted or gaged by these nuts. When the governor is set up, as shown, so as to be effected by the resistance of the load of the engine dynamometrically, the action of the two forces— viz., the centrifugal action of the balls and the resisting action of the load—oppose each other. This will be seen by observing the arrows marked on the various moving parts. The full-line arrows represent the movements caused by the momentum of the engine, and the dotted-line arrows the movements caused by the draft of the drive-belt. From these arrows a better understanding of the action of the governor when in operation can be had than by any verbal description we can make further than this: When the balls are moved out by the momentum of the engine, the segment-racks H' move in the direction of the full-line arrows, and thus rotate the screws, which draw the eccentric in the direction of the full-line arrow on it, and when the resistance of the load is augmented it acts against the outward flight of the balls, draws them in, and moves all the parts in the direction of the dotted arrows.

We do not claim, broadly, the employment of a rack, pinion, and screws for automatically altering the throw of an eccentric from the movement of a centrifugal regulator, for such a device has been before used, (see patent to Stanton, No. 113,701, April 11, 1871;) but this device was not susceptible of use upon the main or drive shaft of the engine, and the centrifugal device did not rotate about the engine-shaft, nor move the eccentric across said shaft, nor was that device capable of said application.

What we claim as new is—

1. In a steam-engine governing apparatus, the combination, substantially as set forth, of the following elements upon the shaft of the engine: a shifting eccentric, a screw to shift the eccentric, a reciprocating part to rotate the screw, and a centrifugal regulator revolving concentrically with said shaft to actuate the reciprocating part.

2. In a steam-engine governing apparatus, the combination, substantially as set forth, of the following elements upon the shaft of the engine: a shifting eccentric, a compound screw to shift the eccentric, and a centrifugal governor for actuating the said screw.

3. In a steam-engine valve-gear or governing device, the combination, substantially as shown, of a shifting eccentric, a screw for shifting the eccentric, gearing for rotating the screw, and a centrifugal regulator rotating concentrically upon said shaft for actuating said gearing to rotate the said screw.

4. In a steam-engine valve-gear or governing device, the combination, substantially as shown, of a shifting eccentric, a screw for shifting the eccentric, gearing for actuating said screw, a centrifugal governing or regulating device for actuating said gearing, and a dynamometrical governing or regulating device for opposing the centrifugal action of said centrifugal governing device by the resistance of the load upon the engine.

5. In a steam-engine valve-gear or governing device, the combination, substantially as shown, of a shifting eccentric, a screw for shifting the eccentric, gearing for rotating the screw, and a dynamometrical regulating device for actuating said gearing by the action of the load on the engine.

6. In a steam-engine valve-gear or governing device, the combination, substantially as set forth, of the wheel B, the concentric frame C, the links E E E' E', the levers F F, and balls G G, and springs S S, the levers H H, racks H' H', pinions I I, screws I' I² I' I², the nut-plates C', C', and D, and the eccentric D'.

In testimony whereof we affix our signatures in presence of two witnesses.

HENRY R. BARNHURST.
LE GRAND SKINNER.

Witnesses:
JNO. K. HALLOCK,
ROBT. H. PORTER.